(12) United States Patent
Park et al.

(10) Patent No.: US 12,620,642 B2
(45) Date of Patent: May 5, 2026

(54) BATTERY MODULE AND BATTERY PACK INCLUDING THE SAME

(71) Applicant: LG ENERGY SOLUTION, LTD., Seoul (KR)

(72) Inventors: Jinju Park, Daejeon (KR); Hyun Wook Jeon, Daejeon (KR); Seung Ryul Baek, Daejeon (KR); Daegil Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 639 days.

(21) Appl. No.: 17/913,734

(22) PCT Filed: Jul. 21, 2021

(86) PCT No.: PCT/KR2021/009427
§ 371 (c)(1),
(2) Date: Sep. 22, 2022

(87) PCT Pub. No.: WO2022/019653
PCT Pub. Date: Jan. 27, 2022

(65) Prior Publication Data
US 2023/0112676 A1 Apr. 13, 2023

(30) Foreign Application Priority Data
Jul. 22, 2020 (KR) ........................ 10-2020-0091093

(51) Int. Cl.
| | |
|---|---|
| *H01M 10/48* | (2006.01) |
| *H01M 10/613* | (2014.01) |
| *H01M 10/653* | (2014.01) |
| *H01M 50/507* | (2021.01) |

(52) U.S. Cl.
CPC ....... *H01M 10/482* (2013.01); *H01M 10/613* (2015.04); *H01M 10/653* (2015.04); *H01M 50/507* (2021.01)

(58) Field of Classification Search
CPC ............. H01M 50/507; H01M 10/482; H01M 10/613; H01M 10/653
See application file for complete search history.

(56) References Cited

U.S. PATENT DOCUMENTS

| | | |
|---|---|---|
| 2013/0022857 A1 | 1/2013 | Meintschel et al. |
| 2013/0089763 A1 | 4/2013 | Lee |
| 2016/0141712 A1 | 5/2016 | Choi et al. |
| 2018/0019508 A1 | 1/2018 | Lee et al. |

(Continued)

FOREIGN PATENT DOCUMENTS

| | | |
|---|---|---|
| CN | 110444720 A | 11/2019 |
| JP | 2003229266 A | 8/2003 |

(Continued)

*Primary Examiner* — Karie O'Neill Apicella
(74) *Attorney, Agent, or Firm* — Bryan Cave Leighton Paisner LLP

(57) ABSTRACT

A battery module according to one embodiment of the present disclosure includes a battery cell stack including a plurality of battery cells; a housing for the battery cell stack; and a pair of end plates for covering the front and rear surfaces of the battery cell stack, respectively, wherein electrode leads, each protruding from the plurality of battery cells, are formed on the front and rear surfaces of the battery cell stack; and a cooling block disposed between the electrode leads and the end plate.

8 Claims, 5 Drawing Sheets

(56)                    References Cited

U.S. PATENT DOCUMENTS

| 2018/0358592 A1* | 12/2018 | Park ........................ C08K 5/49 |
|---|---|---|
| 2019/0198952 A1 | 6/2019 | Choi et al. |
| 2020/0185797 A1 | 6/2020 | Park et al. |
| 2020/0194851 A1 | 6/2020 | Seo et al. |
| 2021/0005943 A1* | 1/2021 | Park .................... H01M 50/211 |
| 2021/0296721 A1 | 9/2021 | Omura et al. |

FOREIGN PATENT DOCUMENTS

| JP | 2012-248354 A | 12/2012 | |
| JP | 2013229266 A * | 11/2013 | ........... H01M 10/50 |
| JP | 5646726 B2 | 12/2014 | |
| JP | 6255151 B2 | 12/2017 | |
| JP | 2018510463 A | 4/2018 | |
| KR | 10-1217608 B1 | 1/2013 | |
| KR | 10-2014-0039350 A | 4/2014 | |
| KR | 10-2015-0115251 A | 10/2015 | |
| KR | 10-2016-0115582 A | 10/2016 | |
| KR | 10-2017-0034560 A | 3/2017 | |
| KR | 10-2018-0114403 A | 10/2018 | |
| KR | 10-2019-0089586 A | 7/2019 | |
| KR | 10-2019-0110782 A | 10/2019 | |
| KR | 10-2020-0030968 A | 3/2020 | |
| WO | 2020026973 A1 | 2/2020 | |
| WO | WO-2020054998 A1 * | 3/2020 | ............. B60L 50/64 |

* cited by examiner

【FIG. 1】
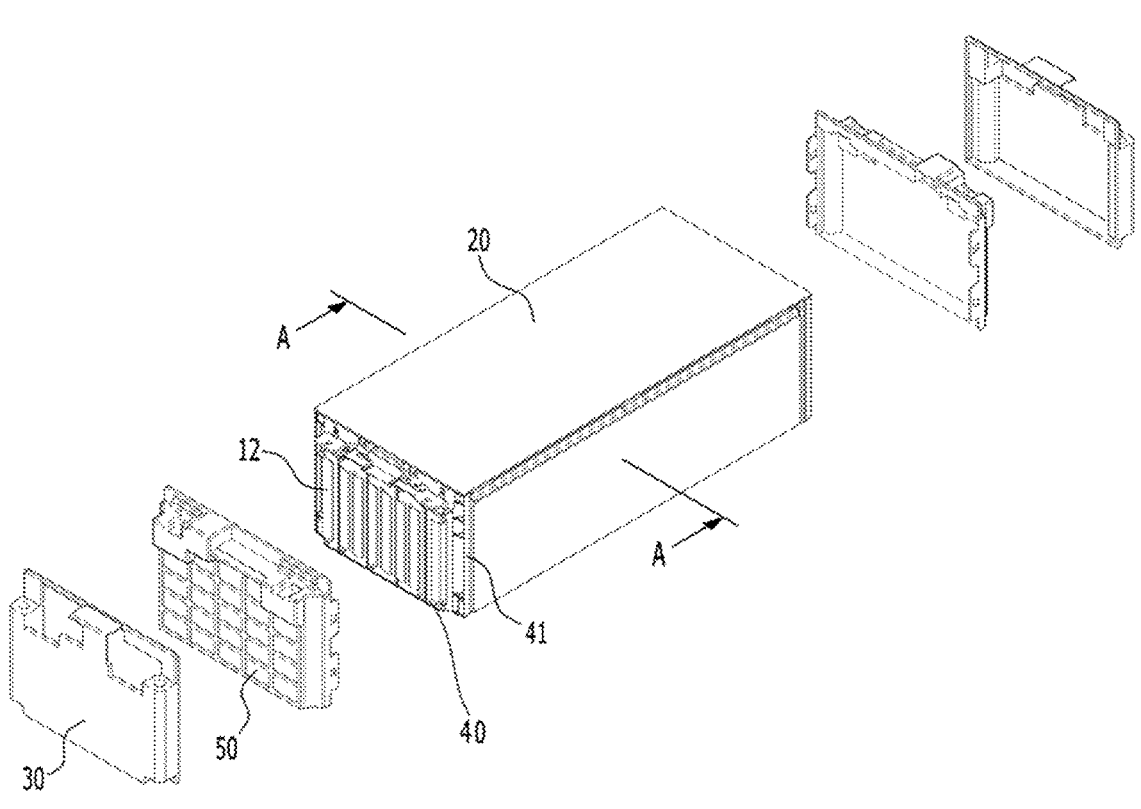

【FIG. 2】
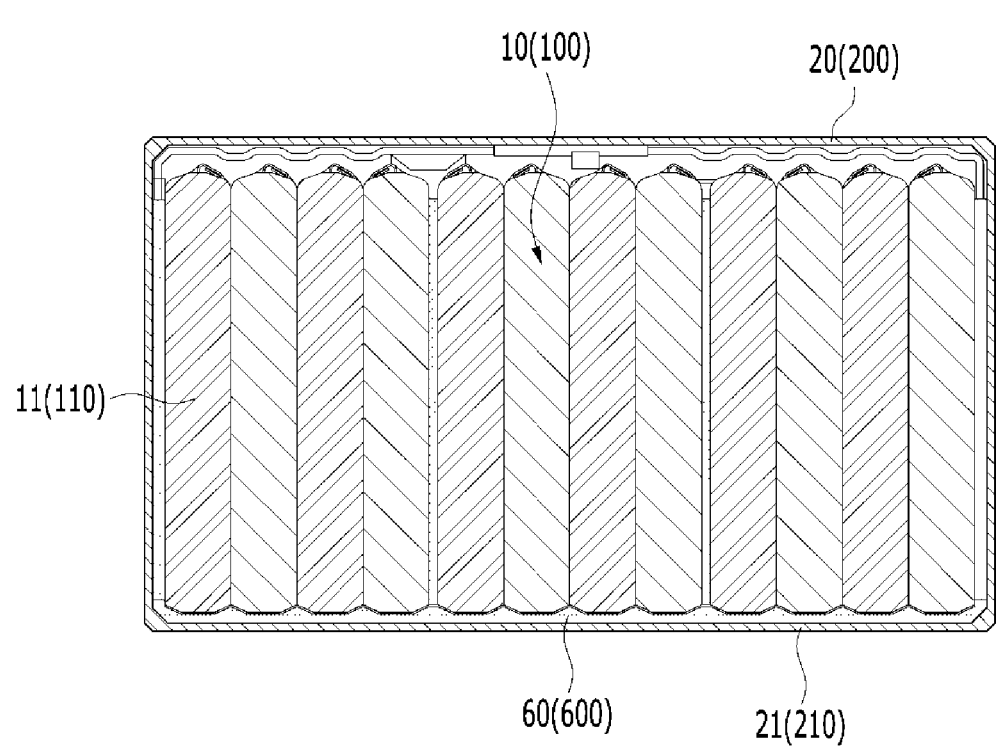

【FIG. 3】
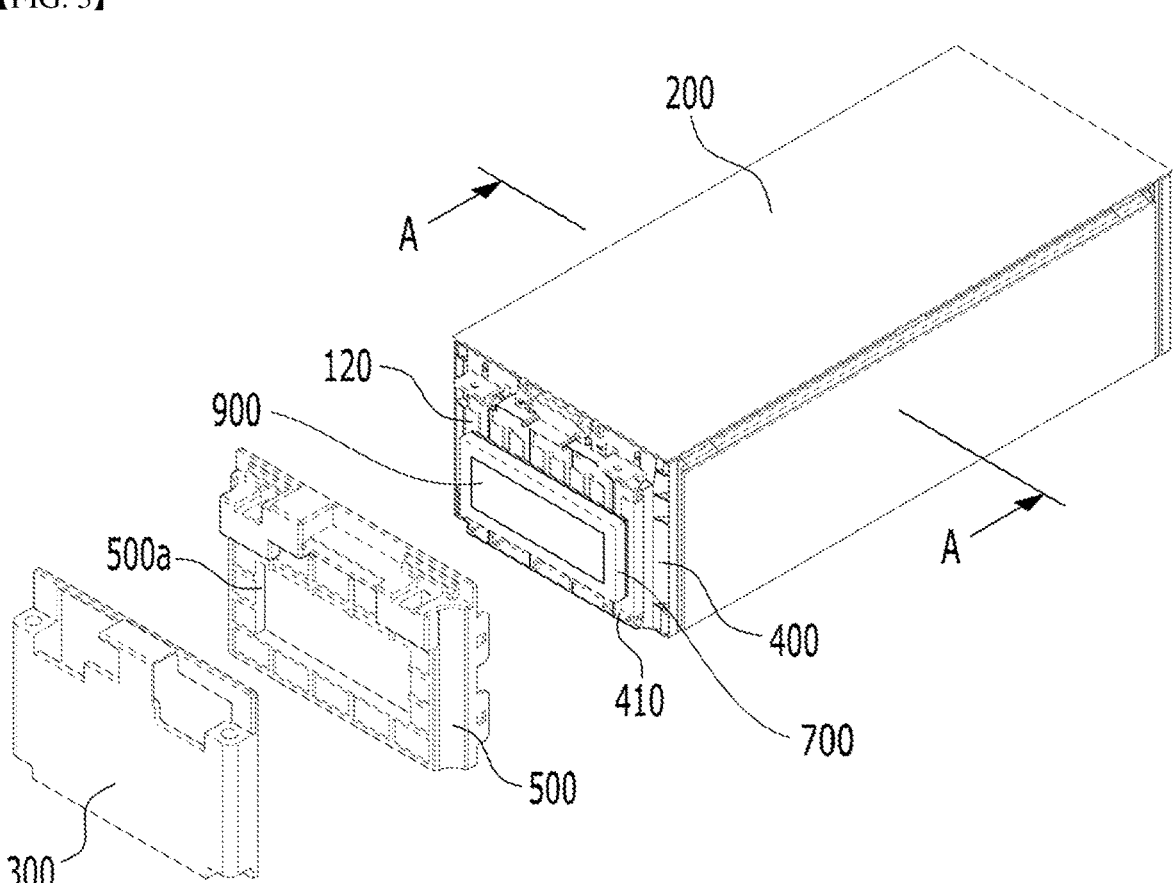

【FIG. 4】
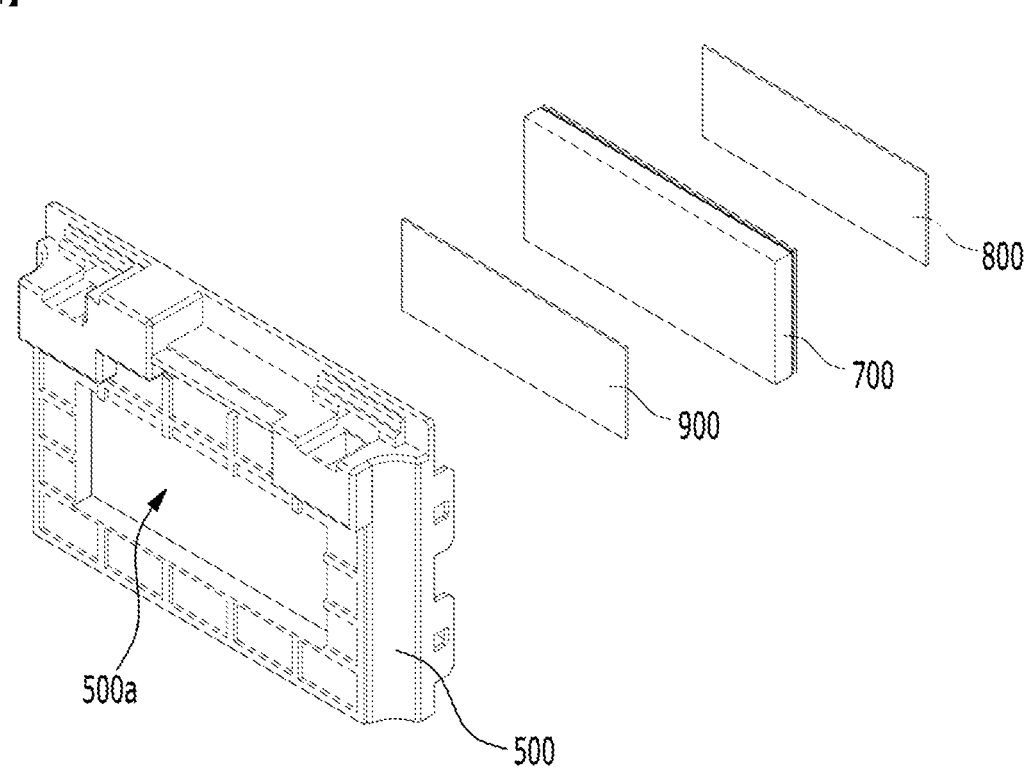

【FIG. 5】
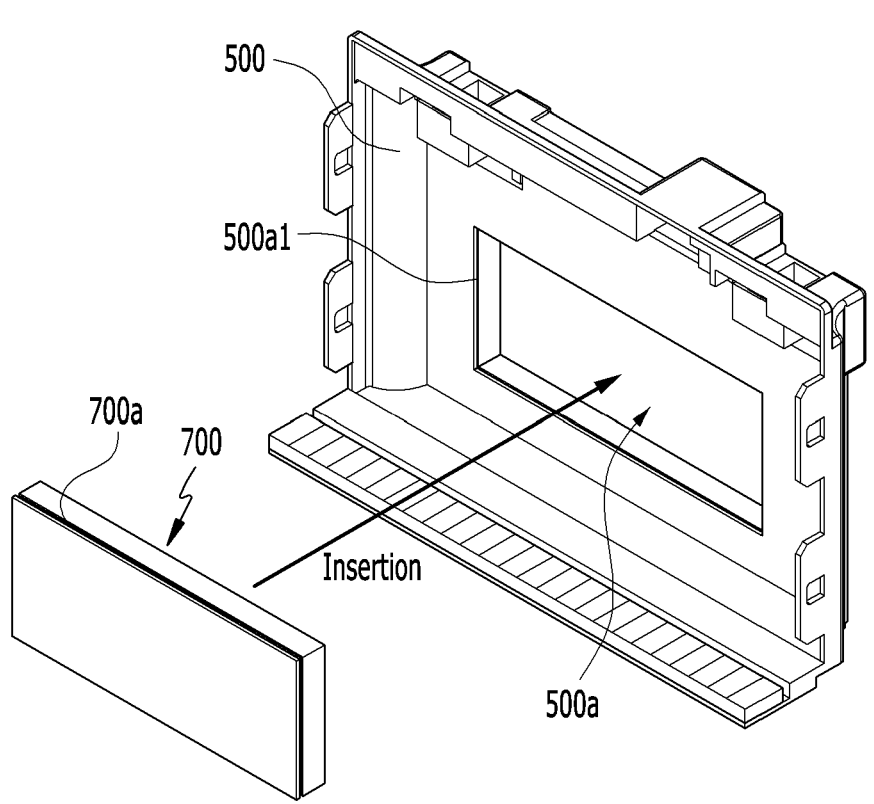

BATTERY MODULE AND BATTERY PACK INCLUDING THE SAME

CROSS CITATION WITH RELATED APPLICATION(S)

This application is a National Phase entry pursuant to 35 U.S.C. § 371 of International Application No. PCT/KR2021/009427, filed on Jul. 21, 2021, and claims priority to and the benefit of Korean Patent Application No. 10-2020-0091093, filed on Jul. 22, 2020 with the Korean Intellectual Property Office, the disclosures of which are incorporated herein by reference in their entirety.

TECHNICAL FIELD

The present disclosure relates to a battery module and a battery pack including the same, and more particularly, to a battery module having improved cooling performance, and a battery pack including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, a method of configuring a battery module composed of at least one battery cell and then adding other components to at least one battery module to configure a battery pack is common.

The battery module may include a battery cell stack including a plurality of battery cells, a housing for the battery cell stack, and a pair of end plates for covering the front and rear surfaces of the battery cell stack, respectively.

FIG. 1 is an exploded perspective view of a conventional battery module. FIG. 2 is a cross-sectional view showing a section A-A of FIG. 1.

Referring to FIGS. 1 and 2, the conventional battery module may include a battery cell stack 10 formed by stacking a plurality of battery cells 11, a housing 20 for the battery cell stack 10, and electrode leads 12 formed to protrude at both ends of the plurality of battery cells 11 constituting the battery cell stack 10.

Further, the battery module may include a busbar frame 41 that is equipped with a busbar 40 coupled to the electrode lead 12 is mounted and covers the front and rear surfaces of the battery cell stack 10, an insulating cover 50 that covers the busbar frame 41 from the outside, an end plate 30 that covers the insulating cover 50 from the outside, and a thermally conductive resin layer 60 that is formed between the battery cell stack 10 and the bottom portion 21 of the housing 20.

In relation to the cooling function of the battery module, conventionally, a thermally conductive resin layer 60 was formed between the bottom portion 21 of the housing and the lower side surface of the battery cell stack 10, so that heat generated from the battery cell stack 10 was transferred to the outside. However, since a separate cooling component is not disposed in the portion where the electrode lead 12 and the busbar 40, actually generating the largest amount of heat in the battery cell, are disposed, the temperature of the portion where the electrode lead 12 and the busbar 40 are located rises locally, so that the temperature deviation between the internal portions of the battery module increases and thereby, the overall performance of the battery module may be deteriorated.

DETAILED DESCRIPTION OF THE INVENTION

Technical Problem

It is an object of the present disclosure to provide a battery module that minimizes the temperature deviation between the internal portions of the battery module and lowers the temperature of the battery cell, thus improving cooling performance, and a battery pack including the same.

The objects of the present disclosure are not limited to the aforementioned objects, and other objects which are not described herein should be clearly understood by those skilled in the art from the following detailed description.

Technical Solution

According to one embodiment of the present disclosure, there is provided a battery module comprising: a battery cell stack comprising a plurality of battery cells; a housing for the battery cell stack; and a pair of end plates for covering the front and rear surfaces of the battery cell stack, respectively, wherein electrode leads, each protruding from the plurality of battery cells, are formed on the front and rear surfaces of the battery cell stack, and a cooling block is disposed between the electrode leads and the end plate.

An insulating cover is formed between the end plate and the electrode leads, and the cooling block may be inserted and coupled to the opening of the insulating cover.

A protrusion is formed on the inner side periphery of the opening, a groove portion is formed around the cooling block, and the protrusion is inserted into the groove portion so that the cooling block can be coupled to the opening.

The insulating cover may be injected by inserting the cooling block into the opening.

Busbars mounted on a busbar frame are disposed between the cooling block and the battery cell stack, and a cooling pad in contact with the cooling block and the busbars may be attached between the cooling block and the busbars.

The cooling pad is formed of a viscous material, and can adhere closely to the surface of the busbar and the busbar frame.

A cooling adhesive may be applied to the cooling block surface of the cooling block facing the end plate.

A thermally conductive resin layer may be formed between the battery cell stack and the housing bottom portion.

The cooling block may include an insulating or thermally conductive material.

According to another embodiment of the present disclosure, there is provided a battery pack comprising the battery module.

Advantageous Effects

A battery module and a battery pack including the same according to embodiments of the present disclosure can minimize a temperature deviation inside the battery module and improve the overall cooling performance of the battery module, by disposing cooling components, such as a cooling block, a cooling pad, and a cooling adhesive, at the portion where the electrode lead and the busbar are located.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an exploded perspective view of a conventional battery module;

FIG. 2 is a cross-sectional view showing a section A-A of FIG. 1 and FIG. 3;

FIG. 3 is an exploded perspective view of a battery module according to one embodiment of the present disclosure;

FIG. 4 is a diagram showing the appearance of cooling components mounted on the insulating cover of FIG. 3; and FIG. 5 is a diagram showing a state in which the cooling block according to one embodiment of the present disclosure is coupled to the insulating cover.

DETAILED DESCRIPTION OF THE EMBODIMENTS

It should be appreciated that the exemplary embodiments, which will be described below, are illustratively described to assist in the understand the present disclosure, and the present disclosure can be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Hereinafter, a battery module according to one embodiment of the present disclosure will be described with reference to FIGS. 2 and 3.

FIG. 3 is an exploded perspective view of a battery module according to one embodiment of the present disclosure.

Referring to FIGS. 2 and 3, the battery module according to one embodiment of the present disclosure includes a battery cell stack 100 in which a plurality of battery cells are stacked, a housing 200 for the battery cell stack 100, and end plates 300 for covering the front and rear surfaces of the battery cell stack 100. Electrode leads 120, each protruding from the plurality of battery cells 110, are formed on the front and rear surfaces of the battery cell stack 100, and a cooling block 700 may be disposed between the electrode leads 120 and the end plate 300.

The battery cell 110 is a secondary battery, and may be configured into a pouch-type secondary battery. Such a battery cell 110 may be composed of a plurality of cells, and the plurality of battery cells may be mutually stacked so as to be electrically connected to each other, thereby forming the battery cell stack 100. Each of the plurality of battery cells may include an electrode assembly, a cell case, and an electrode lead 120 protruding from the electrode assembly.

The housing 200 houses the battery cell stack 100. The housing 200 can be formed of upper, lower, left and right surfaces, so as to cover the four surfaces of upper, lower, left and right of the battery cell stack 100. The battery cell stack 100 housed inside the housing 200 can be physically protected through the housing 200.

A busbar frame 400 is formed so as to cover the front and rear surfaces of the battery cell stack 100, and can be connected with electrode leads formed to extrude from the plurality of battery cells 110 at the front and rear surfaces of the battery cell stack 100. More specifically, electrode leads extended through the busbar frame 400 are coupled to the plurality of busbars 410 mounted on the busbar frame 400, so that the battery cells 110 and the busbars 410 can be electrically connected.

The end plates 300 are respectively formed on the outside of the busbar frame 400 on the basis of the battery cell stack 100, and can be formed so as to cover the battery cell stack 100 and the busbar frame 400. The end plates 300 can protect the busbar frame 400, the battery cell stack 100, and various electrical equipment connected thereto from external impacts, and at the same time, guide the electrical connection between the battery cell stack 100 and an external power.

An insulating cover 500 can be inserted between the end plate 300 and the busbar frame 400. The insulating cover 500 can cut off the electrical connection between the busbar frame 400 and the outside to ensure the insulation performance of the battery module.

A thermally conductive resin layer 600 can be formed on the housing bottom portion 210. The battery cell stack 100 is located on the upper side of the thermally conductive resin layer 600, and the heat generated from the battery cell stack 100 can be transferred to the outside of the battery module. According to this embodiment, the thermally conductive resin layer 600 may be formed of a thermal resin. The thermally conductive resin layer 600 may be formed by a process in which a thermally conductive resin is injected through a plurality of injection holes formed on the housing bottom portion 210 and then cured.

Below, cooling components formed in the insulating cover according to one embodiment of the present disclosure will be described with reference to FIGS. 3 to 5.

FIG. 4 is a diagram showing the appearance of cooling components mounted on the insulating cover of FIG. 3. FIG. 5 is a diagram showing a state in which the cooling block according to one embodiment of the present disclosure is coupled to the insulating cover.

Referring to FIGS. 3 to 5, in the battery module according to one embodiment of the present disclosure, a cooling block is disposed between the electrode leads 120 and the end plate 300. More specifically, an insulating cover 500 is formed between the end plate 300 and the electrode leads 120, and the cooling block 700 may be inserted and coupled to the insulating cover opening 500a formed on the insulating cover 500.

The cooling block 700 includes an insulating or thermally conductive material to ensure insulation performance in the portion of the opening 500a of the insulating cover 500, and at the same time, can transfer the heat generated from the electrode leads 120 and the busbar 410 to the outside. According to this embodiment, the cooling block 700 may include aluminum, aluminum nitride, or alumina having insulation properties and thermal conductivity.

Conventionally, components to carry out cooling are not arranged in the electrode leads and busbars, which generate the largest amount of heat in the battery module, and thus, the temperature of the portion in which the electrode lead and the busbar are located is locally increased, and the temperature deviation between the internal portions of the battery module may become larger. Further, the heat generated from the electrode leads and busbars is hard to be discharged to the outside, and the temperature of the battery module rises, and the performance of the battery module may be deteriorated due to the increase in temperature.

Thus, according to one embodiment of the present disclosure, the cooling block 700 is disposed at the portion where the electrode leads 120 and the busbar 410 are disposed, so that the heat generated in the electrode lead 120 and the busbar 410 can be cooled. More specifically, the heat generated from the electrode leads 120 and the busbar 410 may be discharged to the outside through the end plate 300 via the cooling block 700. In addition to the heat transfer path through which the heat generated in the battery cell stack 100 is discharged to the lower side through the thermally conductive resin layer 600 located on the lower side of the existing battery cell stack 100 as described above, a route for discharging to the outside through the front and rear surfaces of the battery cell stack 100 is newly established, so that the heat transfer path may be diversified, and the cooling performance of the battery module can be further improved.

According to the present embodiment, a cooling pad 800 in contact with the cooling block 700 and the busbars 410 can be attached between the cooling block 700 and the busbars 410 mounted on the busbar frame 400. The cooling pad 800 is in direct contact with the busbar 410 and the electrode leads 120 coupled to the outer surface of the busbar 410, so that the heat generated from the busbar 410 and the electrode leads 120 can be transferred directly to the cooling block 700.

The cooling pad 800 is formed of a viscous material and adheres closely to the surface of the busbar 410 and the busbar frame 400 in which irregularities are present, whereby the heat generated from the busbar 410 and the electrode leads 120 can reduce the interfacial resistance through surface contact and can be more efficiently transferred to the cooling block 700.

According to the present embodiment, the cooling adhesive 900 can be applied on a surface of the cooling block facing the end plate 300. The cooling adhesive 900 includes a heat transfer material, reduces the interface resistance between the end plate 300 and the cooling block 700, and efficiently discharge the heat transferred to the cooling block 700 to the outside through the end plate 300. According to the present embodiment, the end plate 300 may include aluminum having excellent thermal conductivity.

FIG. 5 shows a state in which the cooling block 700 is coupled to the insulating cover 500. The insulating cover 500 can be injected by inserting the cooling block 700 into the opening 500a. Thereby, the rigidity of the insulating cover 500 in which the opening 500a is formed can be obtained. As shown in FIG. 5, a groove portion 700a is formed in the cooling block 700 according to this embodiment, a protrusion 500a1 is formed on the inner side periphery of the insulating cover opening 500a, and the protrusion 500a1 can be inserted into the groove portion 700a so that the cooling block 700 can be coupled to the opening. Thereby, the cohesion force between the cooling block 700 and the insulating cover 500 can be strengthened.

The above-mentioned battery module can be included in the battery pack. The battery pack may have a structure in which one or more of the battery modules according to the embodiment of the present disclosure are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also falls under the scope of the present disclosure.

Although the invention has been shown and described with reference to the preferred embodiments, the scope of the present disclosure is not limited thereto, and numerous other modifications and embodiments can be devised by those skilled in the art that will fall within the spirit and scope of the principles of the invention described in the appended claims. Further, these modified embodiments should not be understood individually from the technical spirit or perspective of the present disclosure.

DESCRIPTION OF REFERENCE NUMERALS

100: battery cell stack
110: battery cell
120: electrode lead
200: housing
210: housing bottom portion
300: end plate
400: busbar frame
410: busbar
500: insulating cover
500a: insulating cover opening
500a1: protrusion
600: thermally conductive resin layer
700: cooling block
700a: groove portion
800: cooling pad
900: cooling adhesive

The invention claimed is:

1. A battery module comprising:

a battery cell stack comprising a plurality of battery cells;

a housing for the battery cell stack; and a pair of end plates for covering the front and rear surfaces of the battery cell stack, respectively, wherein electrode leads, each protruding from the plurality of battery cells, are formed on the front and rear surfaces of the battery cell stack, wherein a cooling block is disposed between the electrode leads and the end plate, wherein an insulating cover is formed between the end plate and the electrode leads, wherein the cooling block is configured to be inserted to an opening of the insulating cover, wherein the cooling block is configured to transfer heat generated from the electrode leads to the end plates, and wherein the cooling block is coupled to the opening of the insulating cover.

2. The battery module of claim 1, wherein:

a protrusion is formed on an inner side periphery of the opening, a groove portion is formed around the cooling block, and the protrusion is inserted into the groove portion so that the cooling block is coupled to the opening.

3. The battery module of claim 1, wherein:

busbars mounted on a busbar frame are disposed between the cooling block and the battery cell stack, and a cooling pad in contact with the cooling block and the busbars is attached between the cooling block and the busbars.

4. The battery module of claim 3, wherein:

the cooling pad is formed of a viscous material and adheres closely to the surface of the busbar and the busbar frame.

5. The battery module of claim 1, wherein:

a cooling adhesive is applied on a surface of the cooling block facing the end plate.

6. The battery module of claim 1, wherein:

a thermally conductive resin layer is formed between the battery cell stack and a bottom portion of the housing.

7. The battery module of claim 1, wherein:

the cooling block comprises an insulating material or a thermally conductive material.

8. A battery pack comprising the battery module of claim 1.

\* \* \* \* \*